INVENTORS
Katherine K. H. Kang
Young Ok Kang

BY *George W. T. Loo*
ATTORNEY

INVENTORS
Katherine K. H. Kang
Young Ok Kang

United States Patent Office 3,579,713
Patented May 25, 1971

3,579,713
SKEWER MEAT DEVICE
Katherine K. H. Kang and Young Ok Kang, both of
1198 Alewa Drive, Honolulu, Hawaii 96817
Filed Sept. 2, 1969, Ser. No. 854,659
Int. Cl. A47j 43/28
U.S. Cl. 17—1                                    4 Claims

ABSTRACT OF THE DISCLOSURE

A skewer meat device which facilitates the skewering of pieces of meat by a skewer. Pieces of meat are placed lengthwise on the middle portion of one of two grids of the device. Then the device is closed to press the pieces of meat into alternate ridges and furrows. Then a skewer is inserted into the pieces of meat through a lengthwise hole in the device. Then the device is opened and the skewered meat is removed. The process is repeated as often as necessary for other pieces of meat to be skewered.

---

The present invention relates to a skewer meat device which eliminates the skewering of pieces of meat by hand and allows the skewering of several pieces of meat in one operation.

An object of this invention is to provide a skewer meat device which eliminates the skewering of pieces of meat by hand.

Another object of this invention is to provide a skewer meat device which will skewer several pieces of meat in one easy operation.

Still another object of this invention is to provide a skewer meat device which eliminates the piercing of fingers by a skewer when pieces of meat are being skewered.

Yet another object of this invention is to provide a skewer meat device which will substantially decrease the time and effort required to skewer pieces of meat.

Figure 1:
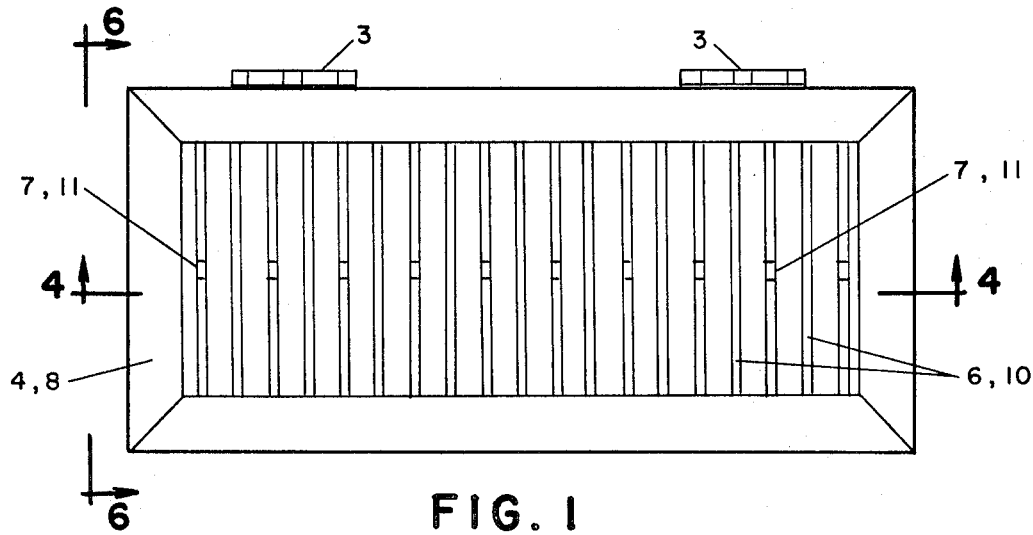
Figure 2:
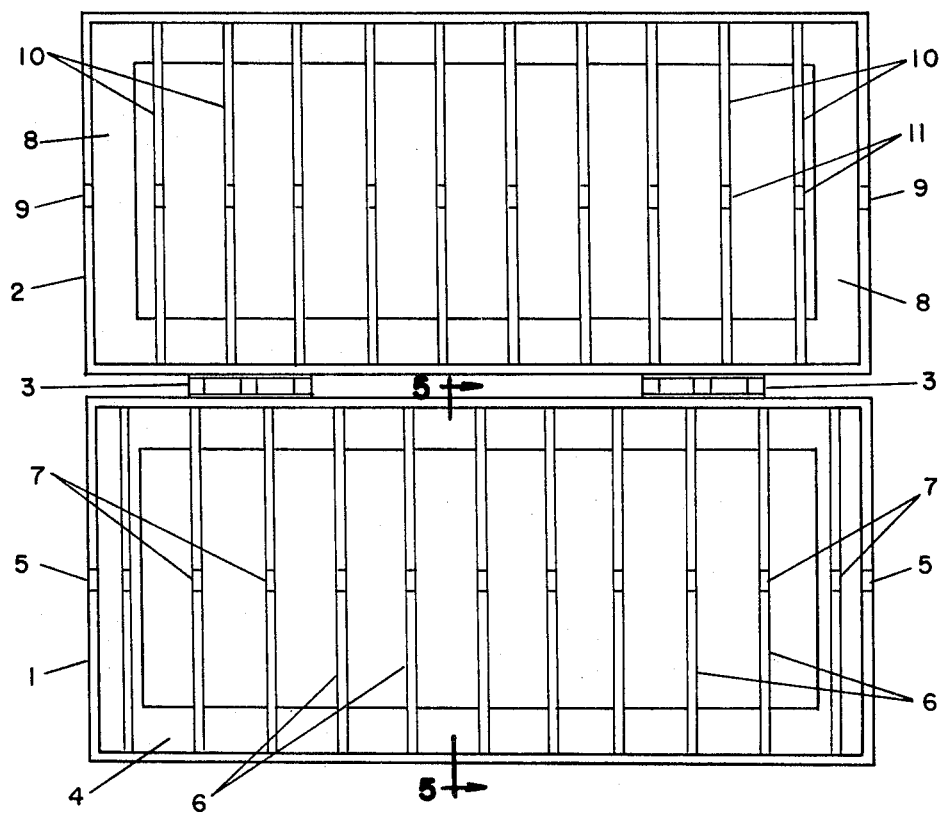
Figure 3:
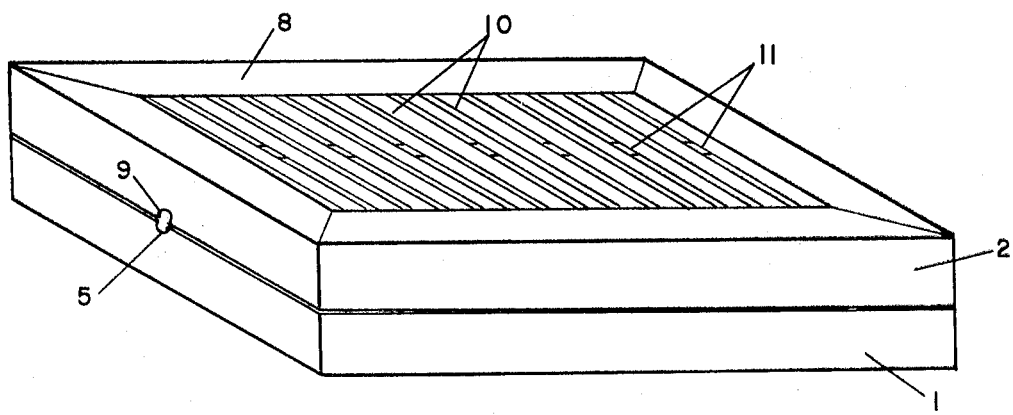
Figure 4:
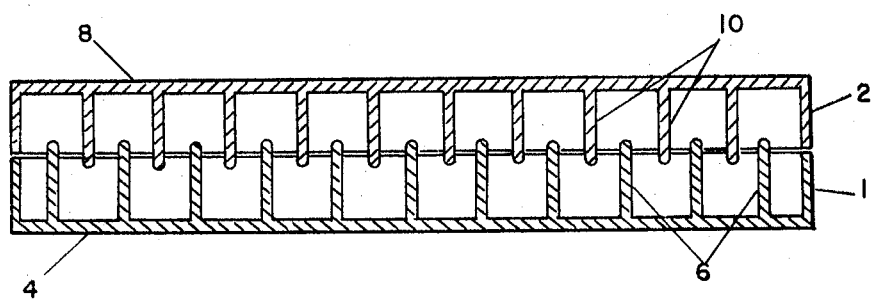
Figure 5:
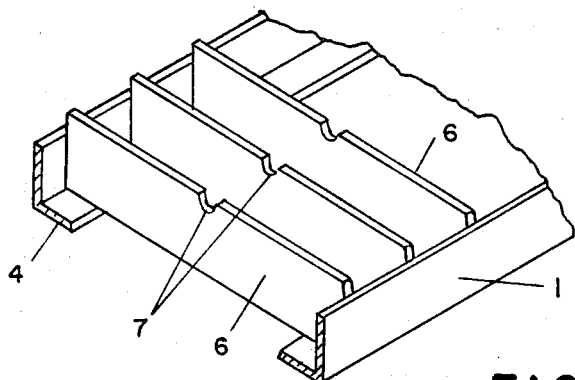
Figure 6:
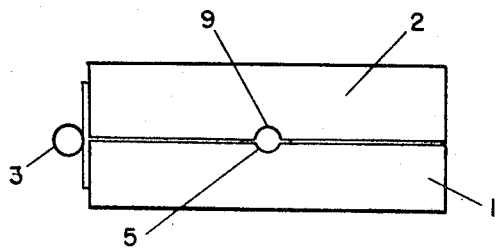

Other objects, features and advantages of the present invention will be readily apparent from the following detailed description taken in connection with the accompanying drawings, in which:

FIG. 1 is a plan view of the device in closed position.
FIG. 2 is a plan view of the device in open position.
FIG. 3 is a perspective view of the device in closed position.
FIG. 4 is a sectional view taken on line 4—4 of FIG. 1 looking in the direction indicated by the arrows.
FIG. 5 is a sectional view taken on line 5—5 of FIG. 2 looking in the direction indicated by the arrows.
FIG. 6 is a side view of the device in closed position.

Before explaining the present invention in detail, it is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing wherein like reference numerals refer to like and corresponding parts throughout the several views, the preferred embodiment of the invention disclosed in FIGS. 1 to 6 inclusive includes grid 1 and grid 2 connected together by hinges 3. Grid 1 includes rectangular frame 4 with parallel bars 6. Rectangular frame 4 is made up of four angle irons connected together. Each of the short sides have a semi-circular notch 5 at their middle portions for a purpose to be disclosed later. Each of the parallel bars are secured to the inside of rectangular frame 4 and extend a distance approximately ⅛″ beyond the frame. The distance between adjacent parallel bars is approximately ¾″. Each of the parallel bars 6 have a U-shaped notch 7 at their middle portions for a purpose to be disclosed later.

Grid 2 includes rectangular frame 8 with parallel bars 10. Rectangular frame 8 is made up of four angle irons connected together. Each of the short sides have a semi-circular notch 9 at their middle portions for a purpose to be disclosed later. Each of the parallel bars are secured to the inside of rectangular frame 8 and extend a distance approximately ⅛″ beyond the frame. The distance between adjacent parallel bars is approximately ¾″. Each of the parallel bars 10 have a U-shaped notch 11 at their middle portions for a purpose to be disclosed later.

The parallel bars 10 are offset a distance of approximately ⅜″ from the parallel bars 6 so that each parallel bar 10 will be aligned approximately in the middle of two adjacent parallel bars 6. There is one more parallel bar 6 than parallel bar 10. The parallel bars 6 overlap the parallel bars 10 a distance of approximately ⅛″ and vice versa when grids 1 and 2 are in closed position. This overlapping of the bars causes pieces of meat to form alternate ridges and furrows when the pieces of meat are pressed by the two grids in closed position.

The semi-circular notches 5 and 9 have a diameter of approximately ⅛″. The U-shaped notches 7 and 11 are approximately ⅛″ wide and ¼″ deep. When grids 1 and 2 are in closed position, a circular lengthwise hole is formed. The diameter of the circular lengthwise hole is made slightly larger than the diameter of the skewer to be used with the device, so that a skewer may be inserted therein to skewer pieces of meat.

The length of the grids 1 and 2 is constructed slightly less than the length of the skewer to be used. The width of the grids 1 and 2 is constructed slightly larger than the pieces of meat to be skewered. We have constructed a skewer meat device with an 8″ length and a 4″ width. We contemplate using pieces of meat having dimensions of approximately 2″ x 2″ x ½″.

Our invention is operated in the following manner: (1) Place the device in open position by putting grids 1 and 2 in side by side position on a flat surface. (2) Place pieces of meat lengthwise over the middle portion of either gride 1 or 2. (3) Place the device in closed position by putting grids 1 and 2 in face to face position. (4) Insert a skewer through the circular lengthwise hole. (5) Place the device in open position. (6) Take skewered meat out. Repeat steps 2–6 as often as necessary to skewer other pieces of meat.

Barbecued meat sticks, consisting of pieces of seasoned meat on sticks cooked over a charcoal fire, are very popular in Hawaii as well as in the Orient. No carnival, party or picnic is complete without barbecued meat sticks. While this delectable dish can be consumed in great numbers by one person, the effort needed in skewering pieces of meat to make the meat sticks is both time consuming and tiring since each piece of meat has to be skewered individually and their is the danger of piercing one's fingers. By use of our invention, several pieces of meat may be skewered in one easy operation with a minimum of effort. Time and effort are cut substantially with no danger of piercing one's fingers with the skewer. Our invention cuts the time for skewering of pieces of meat approximately 1000%.

Our invention may be made of metal, plastic, or any other material which is both strong and light. It may be made larger so that several rows of meat may be skewered in one operation.

Although but a single embodiment of the invention has been disclosed and described herein, it is obvious that many changes may be made in the size, shape, arrangement, and detail of the various elements of the invention without departing from the scope of the novel concepts of the present invention.

We claim as our invention:

1. A skewer meat device including two grids connected by at least one hinge, each grid has a series of parallel bars, the bars of one grid are offset from the bars of the other grid a pre-determined distance and overlap them by a pre-determined distance, each of the grids have two oppositely spaced semi-circular notches, the notches are made so that they form a circular hole with a corresponding notch on the other grid when the grids are in face to face relationship with one another, each of the bars has a U-shaped notch which is aligned with the semi-circular notces of its respective grid.

2. The skewer meat device of claim 1, wherein the grids have rectangular frames and the parallel bars extend a pre-determined distance beyond their respective frames.

3. The skewer meat device of claim 2, wherein one grid has one more bar than the other grid.

4. The skewer meat device of claim 1, wherein the grids are rectangular and are each made up of four L-shaped bars.

References Cited

UNITED STATES PATENTS

| | | | |
|---|---|---|---|
| 2,609,564 | 9/1952 | Grimm | 17—1 |
| 2,815,530 | 12/1957 | Alexander | 17—1 |

LUCIE H. LAUDENSLAGER, Primary Examiner

U.S. Cl. X.R.

99—419